Feb. 14, 1961   TAKASHI NAKANE ET AL   2,971,564
TIRE BANDS APPLYING APPARATUS

Filed Nov. 5, 1957   2 Sheets-Sheet 1

T. NAKANE, T. KOBAYASHI,
M. AKIMOTO, AND H. SENZUWA
INVENTORS

BY Wenderoth, Lind
and Ponack
ATTORNEYS

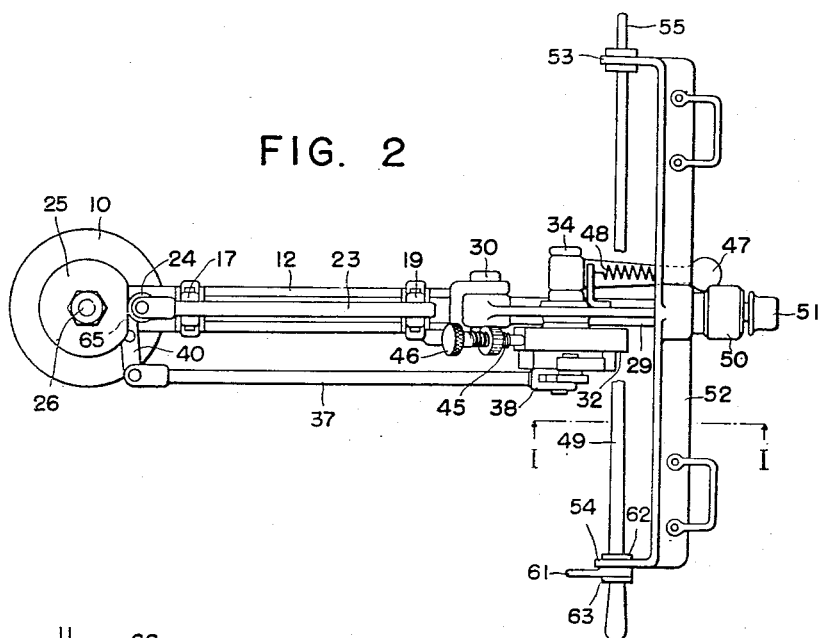
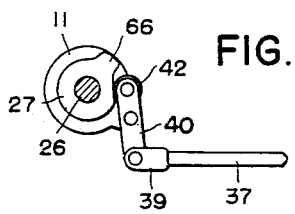
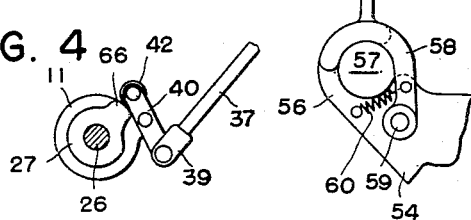
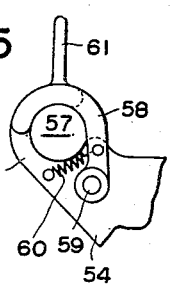

United States Patent Office 2,971,564
Patented Feb. 14, 1961

2,971,564

TIRE BANDS APPLYING APPARATUS

Takashi Nakane, Tokyo, Tatsuo Kobayashi, Fujisawa-shi, and Masao Akimoto and Haruo Senzuwa, Mishima-shi, Japan, assignors to The Yokohama Rubber Company, Limited, Tokyo, Japan Filed Nov. 5, 1957, Ser. No. 694,651

Claims priority, application Japan Jan. 17, 1957

4 Claims. (Cl. 154—10)

The present invention relates to an apparatus for mutually piling tire ply bands used for pneumatic tires for vehicles.

In the conventional manner of piling tire ply bands, a roller for piling bands is operated by the power of the arm of the operator. However, in the case of thus relying on the man power, there will be a difference in strength as between individuals and it will be difficult to obtain uniform products.

The foremost object of the present invention is to provide an apparatus whereby the above mentioned non-uniformity of products due to the man power difference can be eliminated and tire ply bands can be accurately piled in an easy operation.

Another object of the present invention is to provide an apparatus for piling tire ply bands wherein a tension roller facing a tire forming drum is made movable along a curved orbit which is nearly a circle horizontally with respect to said drum so that the facing distance between said roller and drum may be automatically increased depending on the thickness of the ply to be piled due to the operation.

In accordance with the invention a tire ply band applying device comprises a structure adapted to be pivotally attached to a tire building machine and comprising a roller for insertion within a band of tire ply to be applied, the structure being movable about its pivot from a first position to a second position to carry a band of tire ply engaged with said roller onto the building drum, and the radial distance between the axis of the building drum and the roller being automatically increased depending on a thickness of ply just applied on return movement of the structure after each successive ply has been carried onto the drum, by means operatively associated with the structure.

The features and advantages of the present invention shall be explained with reference to the drawings illustrating an embodiment of the invention.

Figure 2 is a plan view of the apparatus shown in Figure 1, a band tensioning roller being partly cut off.

Figures 3 and 4 are plan views illustrating only cam and link means for automatically controlling the distance between the tire forming drum and the band tensioning roller in the present apparatus.

Figure 5 is a magnified partial side view of a mechanism for supporting an arm for bearing the tensioning roller.

Figure 1:
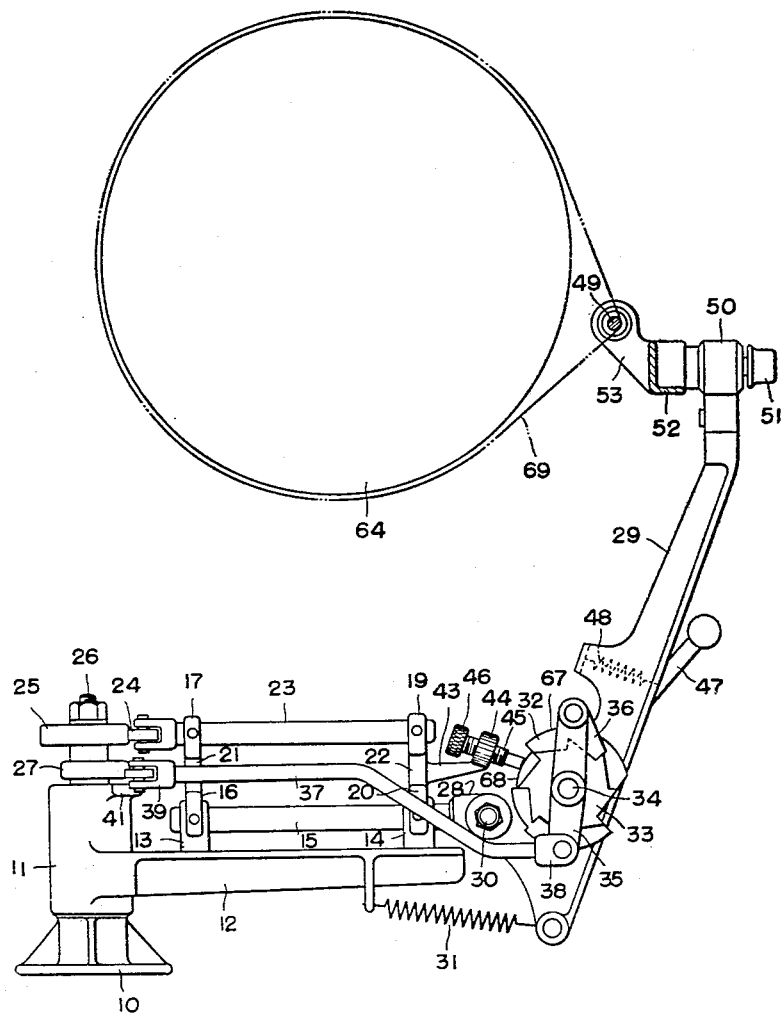
Figure 1 is a side view of an apparatus for piling tire ply bands according to the present invention.

A base 10 functions to securely install the present apparatus on a proper fixture and is provided rotatably with a supporting column 11. A horizontally projecting arm 12 is formed on said supporting column 11 and has two bearing members 13 and 14 on its upper surface. Said bearing members 13 and 14 bear a rod 15 passing through them and pivotally support arms 21 and 22, respectively, by yoke portions 16 and 20 formed at the ends of the respective arms. At the other ends of said arms 21 and 22 are formed yoke portions 17 and 19, respectively, the same as in the above. The rod 23 is pivotally mounted in said yoke portions. Said rod 23 has at its outer end a cam roller 24 which is in contact with a flat cam 25 non-rotatably fixed to a shaft 26 fixed to the base 10. A cam 27 having a curved cam surface is further fixed to said fixed shaft 26.

The outer end of the rod 15 is formed into a yoke 28 to which a lever 29 supporting a band tensioning roller is rotatably fitted by a pivot 30 so as to be always given a clockwise rotating action by a spring 31 hung between the lower end of said lever 29 and the arm 12. Said lever has rotatably mounted on the side thereof a stepped cam 32 and a ratchet wheel 33. Said cam and wheel are rotatably mounted with respect to the lever 29 on a pivot shaft 34 on said lever so as not to relatively rotate relative to each other.

A ratchet pawl lever 35 is attached to the pivot shaft 34 so as to be rotatable relatively with said cam and wheel. A ratchet pawl 36 is attached to the upper end of said lever 35 and a yoke portion 38 at the outer end of a link 37 is pivoted to the lower end. At the other end of said link 37 is formed a yoke portion 39 the same as in the above to which is pivoted one end of a lever 40 (Figure 2). Said lever 40 is rotatably pivoted in the middle between both ends on a projecting ear 41 formed on the column 11 on the base 10. The other end part of said lever 40 is provided with a roller 42 (Figures 3 and 4) which cooperates with the cam 27 fixed to the fixed shaft 26.

On the front surface of the arm 22 is integrally formed a projection 43 at the front end of which is screwed an adjusting screw or stopper 45 so as to be rotated by a roulette portion 46 to control and adjust the projecting length. Said stopper 45 is to cooperate with the stepped cam 32 to restrict the counter-clockwise rotation of the lever 29. A lever 47 is fixed to the shaft 34. A spring 48 is hung between the lever 47 and frame 29 so that the lever 47 may always act to rotate counter-clockwise. Therefore, one of the teeth of the ratchet wheel 33 can be always in contact with the ratchet pawl 36.

A supporting head 50 for a tire band tensioning roller 49 is fixed to the upper end of the lever 29. A supporting arm 52 for the roller 49 is secured to said head 50 by means of a bolt 51 so as to be at right angles to the longitudinal axis of the present apparatus. Bearing portions 53 and 54 for carrying the roller 49 are formed at the respective ends of said arm 52. One bearing portion 53 has only a bearing hole formed therein to pass one end part 55 of the roller 49, whereas the other bearing portion 54 can be opened by means of the structure such as is shown in Figure 5. That is to say, a hook 56 is formed at the forward end of the portion 54. A rotary hook 58 to form a bearing hole 57 in cooperation with said hook 56 is pivoted by a pin 59. A spring 60 is hung between both of said hooks so as to act to close them. A handle 61 is formed on the rotary hook 58. One end of the roller 49 can be fitted in the bearing portion 54 by rotating said handle 61 against the spring 60. The other end 55 of the roller 49 is merely inserted in the bearing hole of the bearing portion 53. The end of the roller 49 borne by the bearing portion 54 is provided with two flanges 62 and 63 so that the roller thus fitted in the bearing portions of the arm 52 may support tire bands in its position. Said hooks 56 and 58 are positioned between said two flanges 62 and 63. Such backing as of a synthetic rubber can be applied to the inside surface of the bearing hole of the bearing portion 53 so as to prevent the wear and clearance.

The operation of the apparatus will now be explained.

The apparatus is mounted by means of the base 10 upon a suitable part of the structure of the tire building machine so that in the position shown in Figures 1 and 2 the longitudinal center line of the arm 18 is at right angles to the axis of the tire forming drum 64.

In this position, the tire ply band tensioning roller 49 is in the band applying position parallel to the tire forming drum 64 as shown and the cam roller 24 is positioned substantially in the middle of the linear part 65 of the cam 25 (Figure 2) and the roller 42 is in a position away from the cam projection 66 of the cam 27 (Figure 3). This condition is shown in Figures 2 and 3. In this condition, the stopper 45 is in contact with the lowest part 68 of the stepped cam 32. The force for urging the stopper 45 and the cam 32 into contact is provided by the tension of the applied tire band 69. The spring 31 serves to oppose the force of said tension for making the effective force mild; the force of tension of the tire band 69 is far greater than that of the spring 31.

Now, when the apparatus is rotated counter-clockwise in Figure 2 around the fixed shaft 26 to a band loading position, the cam roller 42 will mount the cam projection 66 as shown in Figure 4. When the roller 42 thus mounts the cam projection 66, the link 37 will be pulled to the left in Figure 2, the lever 35 will rotate clockwise, the ratchet pawl 36 will rotate the ratchet wheel 33 one tooth, the stepped cam 32 will be also rotated with the motion of the ratchet wheel 33 and the outer end of the stopper 45 will ride on the next higher part 67. When the first tire band 69 is applied on the drum 64, the stopper 45 contacts the lowest step 68 of the cam 32 (Figure 1). After the tire band 69 has been applied on the drum 64, the arm 12 is swung about the shaft 26 in the counterclockwise direction as viewed in Figure 2. Concurrent with this operation, the cam 32 is rotated one step in the clockwise direction as viewed in Figure 1 by means of the operation of the cam 27 as mentioned above. As the result, the stopper 45 comes into contact with a higher step 67 next to the lowest step 68, and the distance between the drum 64 and the roller bar 49 increases by one increment. Such operations are repeated for each successive supplying of tire bands to the drum. Accordingly, the distance between the drum 64 and the roller bar 49 increases step by step, maintaining the distance between the outermost tire band on the drum and the roller bar substantially constant. When predetermined number of tire bands have been applied on the building drum, the stopper 45 comes into contact with the highest stage of the cam 32.

In applying a new band 69 onto the drum, the band 69 is hung on the roller 49 in the loading position and the apparatus is returned to the original position (Figs. 1 and 2). As the stopper 45 is on said next part 67 of the stepped cam, if the difference between the heights of the steps 67 and 68 is made so as to correspond to the thickness of the band, the said next tire band will be applied on the tire forming drum 64, with the roller 49 moved radially away from the drum 64 a distance equal to the said thickness of the band.

During the return rotation of the apparatus around the shaft 26, the cam roller 24 will move from the arcuate part to the linear part 65 of the cam 25 (Figure 2). While the cam roller 24 moves on the surface of the said linear part 65, the supporting head 50 of the roller 49 will not make a circular motion but will pass through a path which is nearly linear. Therefore, the roller 49, too, will accordingly move nearly linearly, parallel to the drum axis. Such motion will help a tire ply band to be easily applied on the drum 64 by the roller 49.

In mounting a tire ply band onto the drum, the band is first threaded over the roller 49 which is then mounted in the bearings 53 and 54. At this stage, the roller is angularly disposed to the drum. The ply band is engaged along one edge with the drum end and the apparatus is then swung clockwise about its pivot mounting while the drum is rotated thereby carrying the band onto the drum. As stated above the last part of the travel of the apparatus is such that the roller moves substantially linearly and parallel to the drum axis. When the band is properly located on the drum, the tire building machine is stopped and the roller 49 disengaged from the ply band and the supporting arm 52. The apparatus can then be swung counterclockwise once more for the mounting of a further ply during which movement, the frame 29 carrying the roller 49 will as previously stated, be moved away from the drum axis to compensate for the thickness of the ply previously applied.

We claim:

1. A tire ply band applying device for a tire building machine, comprising a fixed vertical support on the tire building machine, a link mechanism including an arm pivoted at one end on said fixed support, a horizontal pivot at the other end of the arm, a frame pivotally mounted on said pivot, a support for a tire ply band applying roller on said frame, and an adjusting mechanism on said frame and actuated by said linkage for causing the frame to move through a fixed angle radially away from the tire building drum of the machine each time the arm is swung from a first position directed at a right angle to the tire drum axis to a second position at an angle other than 90° to said axis.

2. A tire ply band applying device as claimed in claim 1 in which said adjusting mechanism comprises a stepped cam rotatably mounted on said frame, a stop on the arm, said cam being held against said stop by the tension in a tire band on said frame, and means connected to and actuated by said linkage for rotating the cam through the angle subtended by each step of the cam when the arm is moved from said first position to the second position.

3. A tire ply band applying device as claimed in claim 2 in which said means for rotating the cam comprises a ratchet wheel fixed to the cam and having teeth corresponding to the cam steps, and a pawl engageable with the ratchet wheel teeth and connected to said linkage, said tire band applying device further comprising a cam roller on said linkage, and a linkage actuating cam secured to said fixed support for the arm on which latter cam said cam roller rolls.

4. A tire ply applying device as claimed in claim 3 and a further linkage actuating cam on said fixed support and having a flat side, said linkage having a further cam roller thereon rolling on said further linkage actuating cam, said linkage also being connected to said stop for moving said stop with respect to the arm during a part of the rotary movement of the arm between its first and second positions and said flat portion on said further linkage actuating cam causes a substantially linear movement of the tire ply applying roller on said frame as the arm approaches its second position.

References Cited in the file of this patent

UNITED STATES PATENTS

| | | |
|---|---|---|
| 1,648,842 | Denmire | Nov. 8, 1927 |
| 1,669,620 | Maas | May 15, 1928 |
| 2,529,739 | Powers | Nov. 14, 1950 |
| 2,537,649 | Smith | Jan. 9, 1951 |
| 2,681,684 | Giletta et al. | June 22, 1954 |
| 2,828,797 | Vanzo et al. | Apr. 1, 1958 |